United States Patent
Kim (10) Patent No.: US 7,949,884 B2
(45) Date of Patent: May 24, 2011

(54) APPARATUS AND METHOD FOR MANAGING POWER-SAVING MODE OF PORTABLE TERMINAL

(75) Inventor: Jong-Yol Kim, Seongnam-si (KR)

(73) Assignee: Samsung Electronics Co., Ltd (KR)

( * ) Notice: Subject to any disclaimer, the term of this patent is extended or adjusted under 35 U.S.C. 154(b) by 869 days.

(21) Appl. No.: 11/854,458

(22) Filed: Sep. 12, 2007

(65) Prior Publication Data

US 2008/0072086 A1 Mar. 20, 2008

(30) Foreign Application Priority Data

Sep. 15, 2006 (KR) ........................ 10-2006-0089464

(51) Int. Cl.
*G06F 1/00* (2006.01)
*G06F 1/26* (2006.01)
*G06F 1/32* (2006.01)

(52) U.S. Cl. ........................ 713/300; 713/320
(58) Field of Classification Search .................. 713/300, 713/320
See application file for complete search history.

(56) References Cited

U.S. PATENT DOCUMENTS

| | | | | |
|---|---|---|---|---|
| 4,124,889 A | * | 11/1978 | Kaufman et al. | 710/2 |
| 4,951,309 A | * | 8/1990 | Gross et al. | 379/102.04 |
| 6,804,542 B1 | * | 10/2004 | Haartsen | 455/574 |
| 7,400,667 B2 | * | 7/2008 | Sudo et al. | 375/147 |
| 2002/0132603 A1 | | 9/2002 | Lindskog et al. | |
| 2005/0024651 A1 | * | 2/2005 | Yu et al. | 358/1.9 |
| 2005/0097370 A1 | * | 5/2005 | Idan et al. | 713/300 |
| 2006/0140218 A1 | | 6/2006 | Winterton | |

FOREIGN PATENT DOCUMENTS

| | | |
|---|---|---|
| KR | 101999002939 | 1/1999 |
| WO | WO 2005/002137 | 1/2005 |

OTHER PUBLICATIONS

"Part 16: Air Interface for Fixed and Mobile Broadband Wireless Access Sytems, Amendment 2: Physical and Medium Access Control Layers for Combined Fixed and Mobile Operation in Licensed Bands", LAN/MAN Standards Committee IEEE STD 802.16e-2005, Feb. 28, 2006.

* cited by examiner

*Primary Examiner* — Mark Connolly
(74) *Attorney, Agent, or Firm* — The Farrell Law Firm, P.C.

(57) ABSTRACT

An apparatus and method for managing a power-saving mode of a portable terminal are provided. The method includes when a application program is running, assigning a network traffic type of the application program with one of a class type selected from a plurality of predefined class types of a sleep mode, instructing a modem to operate in the sleep mode of the assigned class type, and operating the modem in the sleep mode of the assigned class type.

5 Claims, 6 Drawing Sheets

APPARATUS AND METHOD FOR MANAGING POWER-SAVING MODE OF PORTABLE TERMINAL

PRIORITY

This application claims priority under 35 U.S.C. §119(a) to a Korean Patent Application filed in the Korean Intellectual Property Office on Sep. 15, 2006 and assigned Serial No. 2006-89464, the contents of which are incorporated herein by reference.

BACKGROUND OF THE INVENTION

1. Field of the Invention

The present invention relates to management of a power-saving mode, and in particular, to an apparatus and method for managing a power-saving mode (e.g., an idle mode and a sleep mode) of a portable terminal.

2. Description of the Related Art

In a 4th Generation (4G) communication system, research is actively being conducted to provide users with a variety of Quality of Services (QoSs) at a high data transfer rate of about 100 Mbps. In particular, in a Broadband Wireless Access (BWA) communication system such as a Local Area Network (LAN) system or a Metropolitan Area Network (MAN) system, research is being conducted so that high-speed service can be supported while ensuring mobility and QoS. One example of such a communication system includes the BWA communication system based on the Institute of Electrical and Electronics Engineers (IEEE) 802.16d standard or the IEEE 802.16e standard.

The system based on the IEEE 802.16d standard or the IEEE 802.16e standard employs an Orthogonal Frequency Division Multiplexing (OFDM)/Orthogonal Frequency Division Multiple Access (OFDMA) scheme so that a physical channel of the wireless MAN system can support a broadband access network. The communication system based on the IEEE 802.16d is implemented in consideration of only a single cell structure in a state that a Subscriber Station (SS) is fixedly located, that is, a mobility of the SS is not taken into consideration. The communication system based on the IEEE 802.16e is improved from the communication system based on the IEEE 802.16d in a sense that a mobility of the SS is taken into consideration. An SS providing mobility is defined as a Mobile Station (MS). Hereinafter, the SS and the MS will be referred to as a portable terminal, and the portable terminal includes all terminals that can be carried by a user.

The communication system based on the IEEE 802.16e standard can offer optimal data transfer efficiency with a high speed data transfer rate since orthogonality is maintained among a plurality of sub-carriers while transferring data. Further, good frequency usage efficiency and strong multi-path fading also facilitate the optimal data transfer efficiency.

The OFDM/OFDMA scheme uses a technique whereby a sub-channel is formed to use a sub-carrier which is shared to enhance channel efficiency between a Base Station (BS) and a plurality of portable terminals located within one cell, and the sub-carrier is then assigned to a portable terminal.

Examples of the communication system based on the IEEE802.16 die include Wimax, Wibro, and Mobile Wimax systems. A portable terminal employing a Wibro technique is generally implemented in the form of a notebook computer in which a Personal Computer Memory Card International Association (PCMCIA) card is included in a built-in manner or in the form of a personal portable terminal such as Personal Digital Assistant (PDA).

A portable terminal compliant with the IEEE 802.16e standard supports high-speed data communication, resulting in large amount of power consumption. Therefore, a power-saving mode has been introduced in the IEEE 802.16e standard so as to reduce power consumed in the portable terminal.

The power-saving mode is roughly classified into two modes, an idle mode and a sleep mode. First, the idle mode is provided to save power as well as unused wireless resources of the portable terminal. While in the idle mode, a message which is broadcast from a BS is periodically received in a state that connection between the portable terminal and the BS is released. Transition to the idle mode may be achieved when the portable terminal sends a request to the BS. Also, transition to the idle mode may be achieved in response to an instruction of the BS without the request of the portable terminal.

Second, the sleep mode is defined as a mode in which wireless resources are not used for a predetermined period of time while the portable terminal is operating. A time period for using a wireless resource is defined as a listen window, and a time period for not using the wireless resource is defined as a sleep window.

Figure 1:
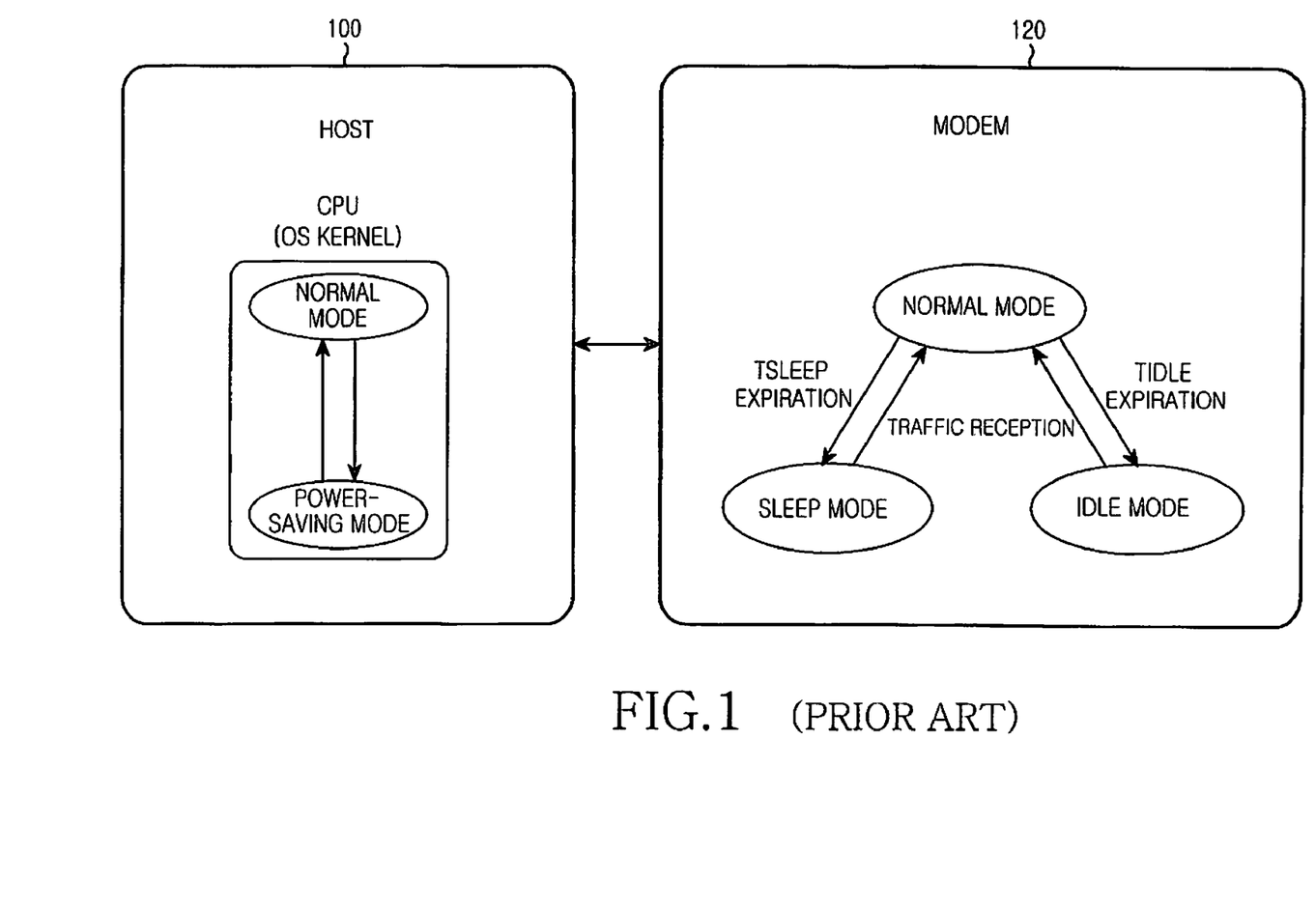
FIG. 1 illustrates an operation of a conventional power-saving mode.

FIG. 1 illustrates an operation of a conventional power-saving mode.

In FIG. 1, the IEEE 802.16e standard describes how a transition is made from an idle mode or sleep mode to a normal mode in a modem 120 of a portable terminal. However, the existing IEEE 802.16e standard does not describe how a power-saving mode of a host (i.e., Central Processing Unit (CPU) in a host) 100 is related to that of the modem 120. Furthermore, mode transition and mode management performed between the host 100 and the modem 120 are not described.

The conventional power-saving mode has a problem. For example, the modem 120 may not switch to a sleep mode or an idle mode while the host 100 has switched to a power-saving mode. In this case, power may be continuously consumed by the modem 120, resulting in waste of power.

Accordingly, there is a needed an apparatus and method for reducing power consumption by allowing a modem to switch to a suitable power-saving mode according to a state of a power-saving mode in a host side and according to a network traffic type used in an application program.

SUMMARY OF THE INVENTION

An aspect of the present invention is to substantially solve at least the above problems and/or disadvantages and to provide at least the advantages below. Accordingly, one aspect of the present invention is to provide an apparatus and method for managing a power-saving mode of a portable terminal.

Another aspect of the present invention also provides an apparatus and method for reducing power consumption by effectively managing a power-saving mode of a portable terminal.

Yet another aspect of the present invention provides an apparatus and method for increasing a service provision time by reducing power consumption of a portable terminal.

According to one aspect of the present invention, there is provided a method of managing a power-saving mode of a portable terminal. The method includes in a power-saving manager, when a specific application program is running, assigning a network traffic type of the application program with one of a class type selected from a plurality of predefined class types of a sleep mode; in the power-saving manager, instructing a modem to operate in the sleep mode of the assigned class type; and operating the modem in the sleep mode of the assigned class type in response to the instruction of the power-saving manager.

According to another aspect of the present invention, there is provided a method of managing a power-saving mode of a portable terminal. The method includes checking whether a controller has switched to an idle mode; and in a power-saving manager, when the controller has switched to the idle mode, allowing a modem to switch to the idle mode.

According to still another aspect of the present invention, there is provided a portable terminal for managing a power-saving mode. The portable terminal includes a power-saving manager which instructs a modem to switch to a first mode when a controller switches to the power-saving mode and which checks a network traffic type of an application program when the application program is running and then selects a class type selected from a plurality of predefined class types of a second mode so that the modem operates in the second mode of the selected class type; and the modem which switches to the first mode in response to the instruction of the power-saving manager or which operates in the second mode of the selected class type.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail. Terminology used herein should be determined in consideration of functionality of the present invention, and it may be variable depending on user's or operator's intention, or customs in the art. Therefore, corresponding meaning should be determined with reference to the entire specification.

Hereinafter, an apparatus and method for managing a power-saving mode of a portable terminal is described below.

A portable terminal employing an Orthogonal Frequency Division Multiple Access (OFDMA) scheme, in particular, a portable terminal employing Wibro, WiMax, or Mobile WiMax based on the Institute of Electrical and Electronics Engineers (IEEE) 802.16e standard is described below. Thus, the present invention may also be applied to other portable terminals using a power-saving mode. In order to improve a conventional power-saving mode, in the present invention, a power-saving manager is provided to manage a state of a modem according to a condition of a controller (i.e., a Central Processing Unit (CPU) in a host side) or according to a network traffic type (Quality of Service (QoS) type) of an application program.

Figure 2:
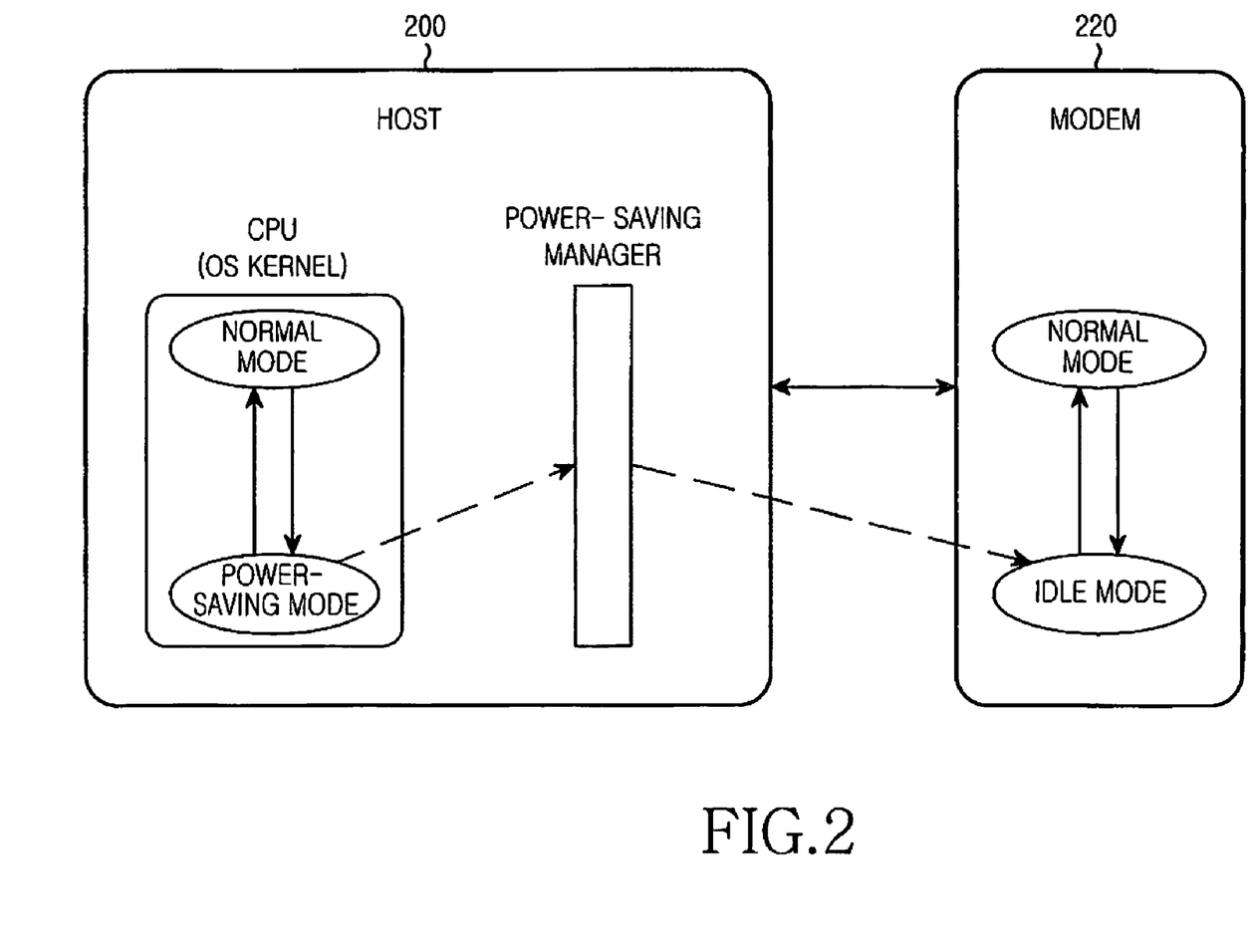
FIG. 2 illustrates an operation of an idle mode according to the present invention.

FIG. 2 illustrates an operation of an idle mode according to the present invention.

In FIG. 2, when a host 200 switches to a power-saving mode, a power-saving manager of the host 200 detects this mode transition and thus sends a corresponding message specified in a predefined protocol to a modem 220. Upon receiving the message, the modem 220 immediately switches to an idle mode. Consequently, the host 200 and the modem 220 switch to a mode for saving power at the same time.

Figure 3:
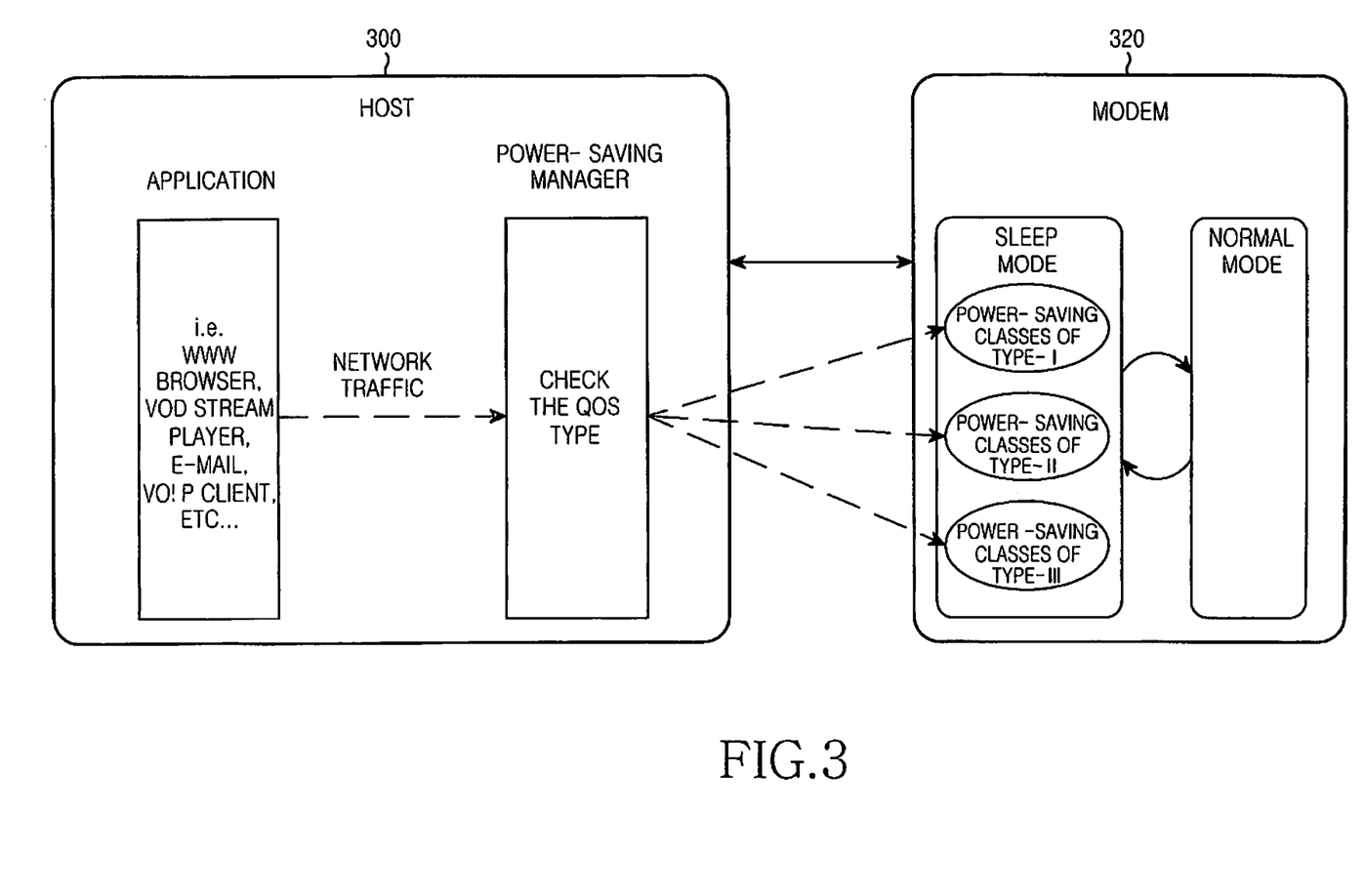
FIG. 3 illustrates an operation of a sleep mode according to the present invention.

FIG. 3 illustrates an operation of a sleep mode according to the present invention.

In FIG. 3, a sleep mode of a modem 320 includes three power-saving class types Type-I, Type-II, and Type-III. A power-saving manager selects one of the power-saving class types Type-I, Type-II, and Type-III as a network traffic type of an application program. When a specific application program (e.g., World Wide Web (WWW) browser) is running, the power-saving manager of a host 300 checks the network traffic type of the application program and then determines a QoS type corresponding to the network traffic type of the application program. According to a predefined standard, the determined QoS type is assigned to the selected power-saving class type. Then, a message specified in a predefined protocol and corresponding to the selected power-saving class type is sent to the modem 320. Upon receiving the message, the modem 320 switches to a sleep mode of the selected power-saving class type.

A listen window and a sleep window operate in a different time period according to which power-saving class type is selected. The three power-saving class types Type-I, Type-II, and Type-III are recommended to be used as follows. Type-I is used for a network traffic type of Best Effort (BE) or None Real Time-Variable Rate (NRT-VR). Type-II is used for a network traffic type of Unsolicited Grant Service (UGS) or Real Time-Variable Rate (RT-VR). Type-III is used for a network traffic type of multicast.

Figure 4:
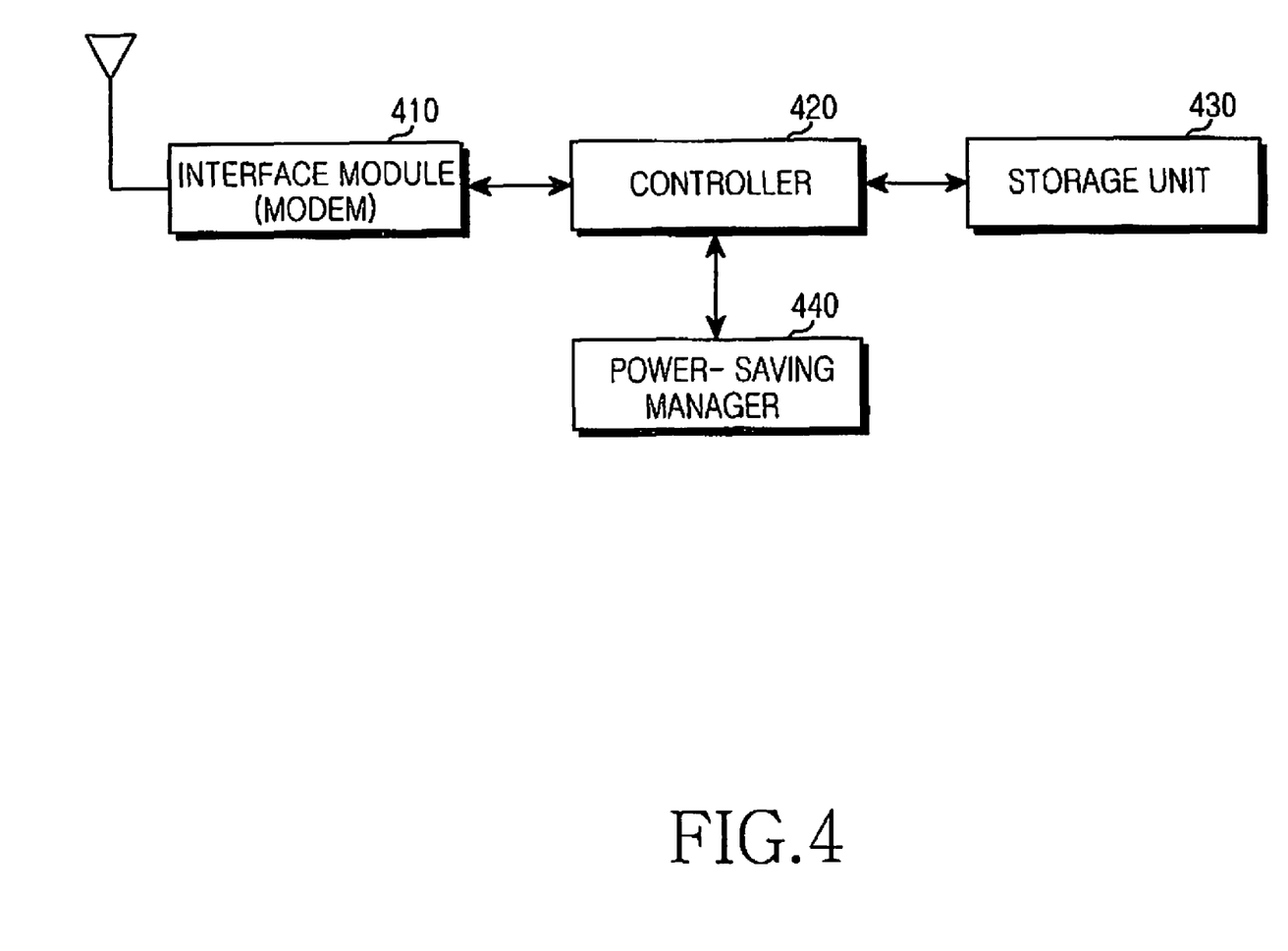
FIG. 4 is a block diagram of a portable terminal according to the present invention.

FIG. 4 is a block diagram of a portable terminal according to the present invention.

In FIG. 4, the portable terminal includes an interface module 410, a controller 420, a storage unit 430, and a power-saving manager 440. The interface module 410 allows communication between different nodes. The interface module 410 includes a Radio Frequency (RF) processor, a base-band processor, and so on. The RF processor converts a signal received via an antenna into a base-band signal, and transmits the converted base-band signal to the base-band processor. Further, the RF processor converts the base-band signal received from the base-band processor into an RF signal, and transmits the converted RF signal through the air via the antenna. The interface module 410 includes a modem. In response to an instruction of the controller 420, the interface module 410 may switch to an idle mode or may operate in a sleep mode of a specific power-saving class type.

The controller 420 controls overall operations of the portable terminal. For example, voice calls and data communications are processed under the control of the controller 420. In addition to a general control function, the controller 420 controls the power-saving manager 440 for managing a power-saving mode.

The power-saving manager 440 allows the interface module 410 to switch to an idle mode when the controller 420 switches to the power-saving mode, according to an instruction of the controller 420. When a specific application program (e.g., WWW browser) is running, a network traffic type of the application program is checked and then a QoS type corresponding to the network traffic is determined. According to a predefined standard, the determined QoS type is assigned to one of the aforementioned power-saving class types Type-I, Type-II, and Type-III. A message corresponding to the power-saving class type assigned with the determined QoS type is then sent to the interface module 410, and thus the interface module 410 operates in the sleep mode of the power-saving class type. The power-saving manager 440 allows the interface module 410 to switch to the idle mode when no data communication is made through the interface module 410 for a specific period of time even if the controller 420 operates in a normal mode. The power-saving manager 440 can operate normally even after the controller 420 switches to the power-saving mode.

The storage unit 430 stores a program for controlling overall operations of the portable terminal and also stores data temporarily generated while performing the program. Furthermore, the storage unit 430 stores information regarding the idle mode and the sleep mode (e.g., information regarding a network traffic type classified according to the power-saving class types Type-I, Type-II, and Type-III).

According to the aforementioned structure, the power-saving manager 440 operates under the control of the controller 420. Although the power-saving manager 440 and the controller 420 are depicted as two separate elements in FIG. 4, this is only for an explanation purpose. Thus, in practice, the power-saving manager 440 may be included in the controller 420 so that all or a part of functions of the power-saving manager 440 can be performed by the controller 420.

Figure 5:
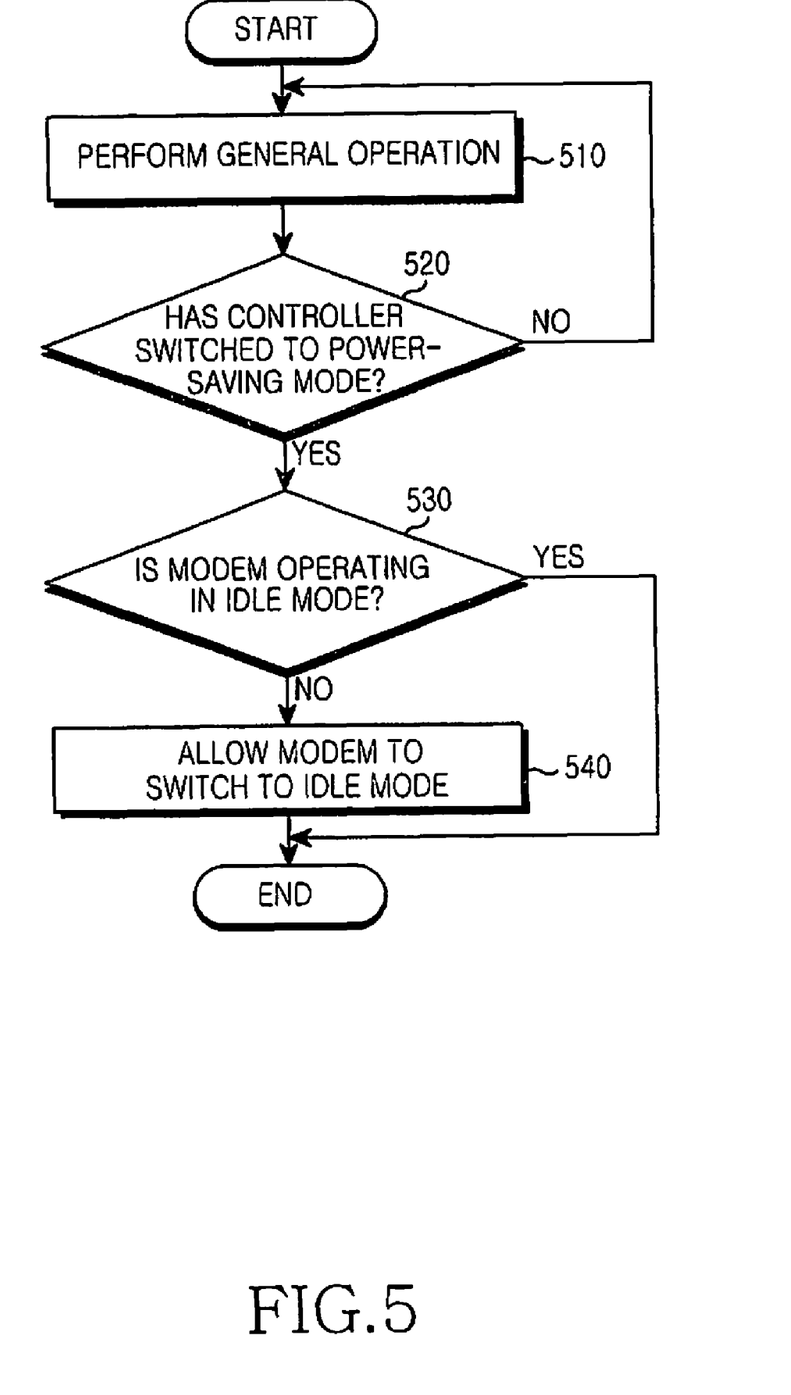
FIG. 5 is a flowchart illustrating a process of an idle mode according to the present invention.

FIG. 5 is a flowchart illustrating a process of an idle mode according to the present invention.

In FIG. 5, in step 510, a portable terminal performs a general operation (e.g., call-waiting, calling, etc.).

In step 520, a power-saving manager checks whether a controller switches to a power-saving mode. If the controller has switched to the power-saving mode, in step 530, the power-saving manage checks whether a modem operates in an idle mode.

If the modem is not currently operating in the idle mode, in step 540, the power-saving manager allows the modem to switch to the idle mode.

Thereafter, the process ends.

Figure 6:
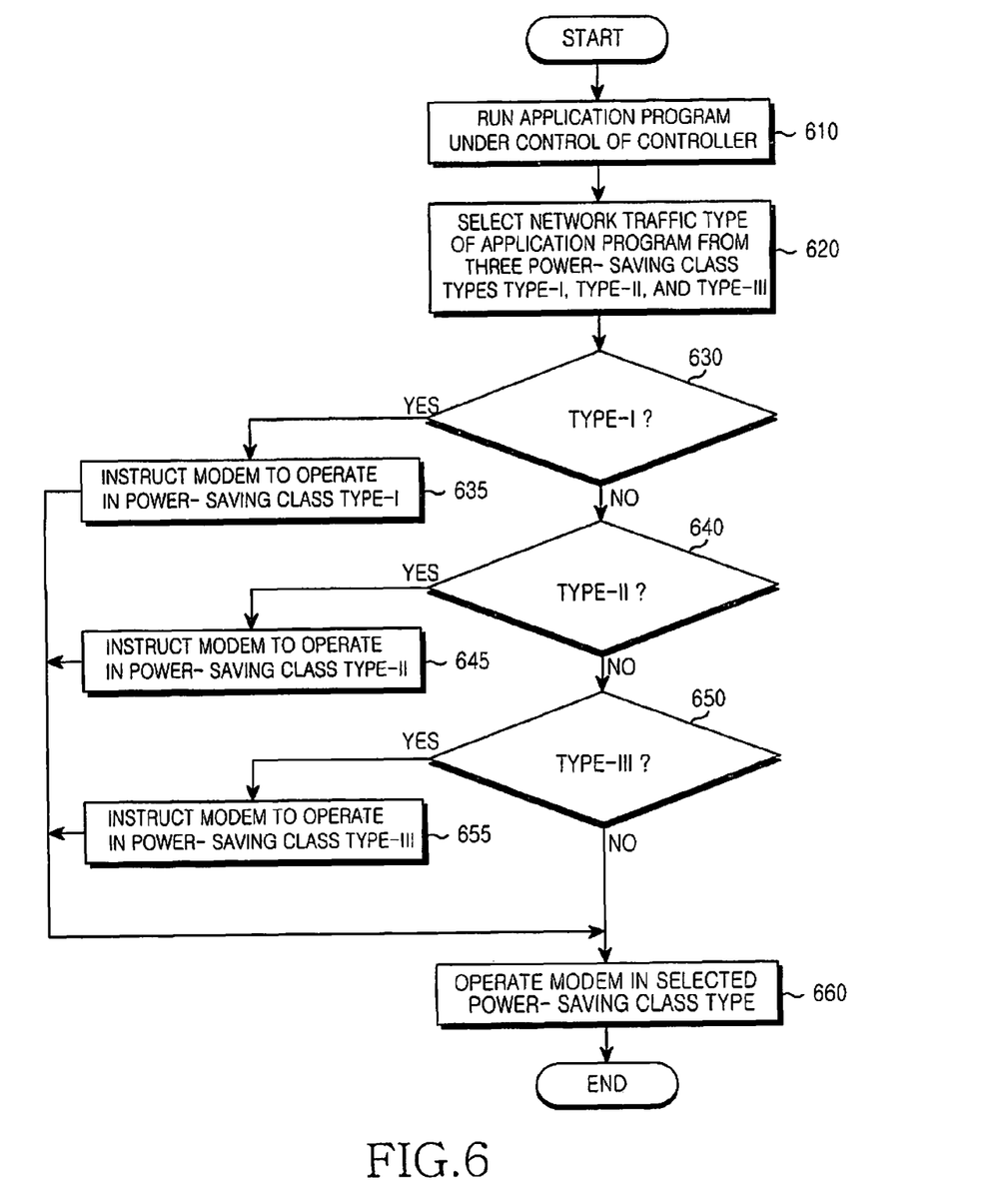
FIG. 6 is a flowchart illustrating a process of a sleep mode according to the present invention.

FIG. 6 is a flowchart illustrating a process of a sleep mode according to the present invention.

FIG. 6, in step 610, either an application program selected by a user or a default application program runs under the control of a controller.

In step 620, a power-saving manager selects a network traffic type of an application program from three power-saving class types Type-I, Type-II, and Type-III classified according to a predefined standard.

In step 630, if Type-I is selected, the procedure goes to step 635. In step 635, the power-saving manager instructs a modem to operate in the power-saving class type Type-I.

In step 640, if Type-II is selected, the procedure goes to step 645. In step 645, the power-saving manager instructs a modem to operate in the power-saving class type Type-II.

In step 650, if Type-III is selected, the procedure goes to step 655. In step 655, the power-saving manager allows a modem to operate in the power-saving class type Type-III.

In step 660, the modem operates in the selected power-saving class type. Thereafter, the process ends.

According to the present invention, a modem operating in a normal mode switches to an idle mode when a controller switches to a power-saving mode. Therefore, power consumption can be reduced. In addition, when a specific application program runs under the control of the controller, the modem can operate in a sleep mode of a specific power-saving class type in consideration of a network traffic type of the application program. Thus, a sleep window time can be ensured which optimizes total power consumption. Therefore, power consumption can be reduced while the application is running.

Alternate embodiments of the present invention can also comprise computer readable codes on a computer readable medium. The computer readable medium includes any data storage device that can store data that can be read by a computer system. Examples of a computer readable medium include magnetic storage media (such as ROM, floppy disks, and hard disks, among others), optical recording media (such as CD-ROMs or DVDS), and storage mechanisms such as carrier waves (such as transmission through the Internet). The computer readable medium can also be distributed over network coupled computer systems so that the computer readable code is stored and executed in a distributed fashion. Also, functional programs, codes, and code segments for accomplishing the present invention can be construed by programmers of ordinary skill in the art to which the present invention pertains.

While the invention has been shown and described with reference to certain preferred embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. A method of managing a power-saving mode of a portable terminal, the method comprising:
   when an application program is running, assigning, by a power-saving manager, a network traffic type of the application program with one of a class type selected from a plurality of class types of a sleep mode;
   instructing, by the power-saving manager, a modem to operate in the sleep mode of the assigned class type; and
   operating, by the power-saving manager, the modem in the sleep mode of the assigned class type,
   wherein the power-saving manager operates independently even when a controller switches to the idle mode.

2. A method of managing a power-saving mode of a portable terminal, the method comprising:
   checking whether a controller has switched to an idle mode; and
   in a power-saving manager, when the controller has switched to the idle mode, allowing a modem to switch to the idle mode,
   wherein the power-saving manager operates independently even when the controller switches to the idle mode.

3. A portable terminal for managing a power-saving mode, the portable terminal comprising:
   a power-saving manager that instructs a modem to switch to a first mode when a controller switches to the power-saving mode and checks a network traffic type of an application program when the application program is running,
   wherein the power-saving manager then selects a class type selected from a plurality of predefined class types of a second mode so that the modem operates in the second mode of the selected class type, and the modem switches to the first mode in response to the instruction of the power-saving manager or operates in the second mode of the selected class type, wherein the power-saving manager operates independently even when the controller switches to the idle mode.

4. The portable terminal of claim 3, wherein the power-saving manager allows the modem to switch to the first mode if data communication is not made through the modem for a certain period of time even when the controller operates in a normal mode.

5. The portable terminal of claim 3, wherein the first mode is an idle mode, and the second mode is a sleep mode.

* * * * *